June 19, 1934.  E. KUTASZEWICZ  1,963,204
GRINDING MACHINE FOR ALL KINDS OF MATERIALS
Filed March 18, 1931
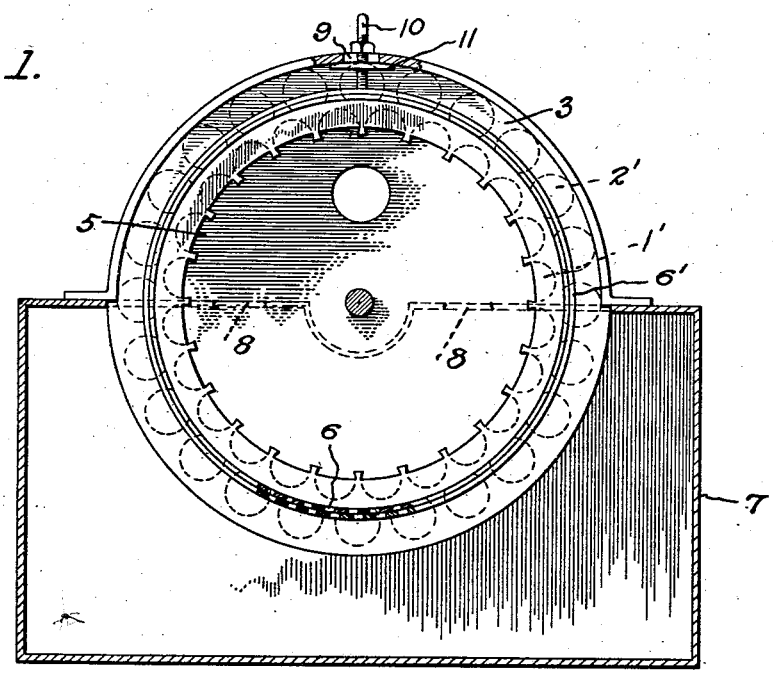
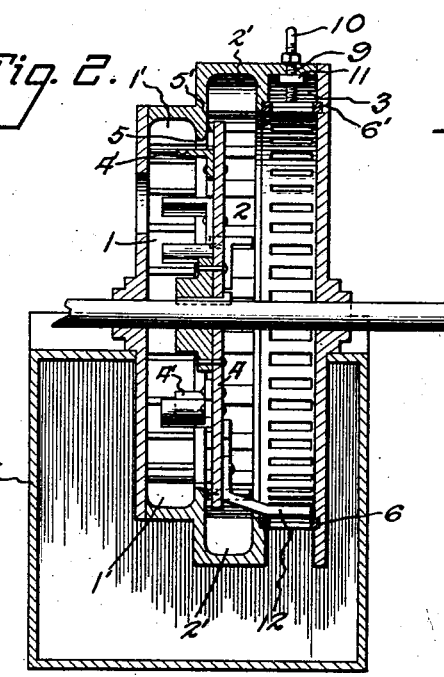
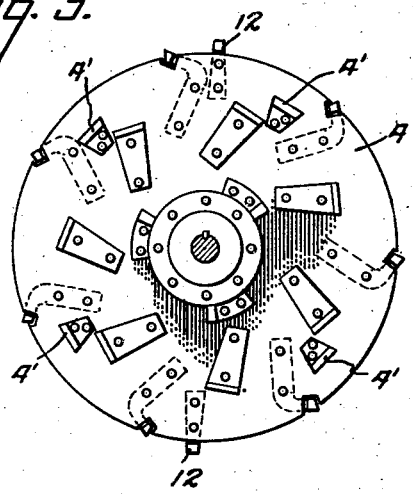
Inventor
E. Kutaszewicz Patented June 19, 1934

1,963,204

UNITED STATES PATENT OFFICE 1,963,204

GRINDING MACHINE FOR ALL KINDS OF MATERIALS

Eugenjusz Kutaszewicz, Pultusk, Poland

Application March 18, 1931, Serial No. 523,590
In Poland April 10, 1930

2 Claims. (Cl. 83—11)

The principal defect of all known machines in which the grinding process is performed by a rapid rotatory movement of a disk with brackets, and by creating strong air whirls and counter-whirls within a stable drum, consists in that these machines do not enable grinding the material at once down to the degree of fineness required. Consequently, the material is to be sifted several times through special devices, and the coarse particles must be ground anew. Furthermore, such machines require a great deal of power due to disproportionate distribution of work and to the pressure created.

The scope of the invention consists in that the pockets in which the material is being disintegrated are distributed uniformly on the whole periphery of every working chamber, and that both the ground material and the air sucked in are led out in the axial direction uniformly on the whole periphery of the chamber into a separate sifting chamber which can be fitted with annular sieves, whose width and size of meshes may be varied ad libitum. This permits an exact sifting, and the air may be led out without creating noxious over-pressure in the machine.

Owing to the use of pockets covered from the rotor side, and of brackets which cover the slit between the rotor and the pockets, the too fast direct transition of the material from the first chamber into the second one is hindered, which reduces to minimum the production of undisintegrated material.

The machine according to the invention possesses also a device for automatic re-conducting of the unground particles back to the working chamber for being ground once more, and thus the machine may produce automatically, without special devices, the material ground down to the degree of fineness required.

An example of the machine according to the invention is shown schematically in Figs. 1, 2 and 3. Fig. 1 is the side view of the machine from the sieve side without rotor and cover, Fig. 2— the sectional view, and Fig. 3—a view of the rotor from the feeding side.

The machine consists of two working chambers 1 and 2 and of a third sieve chamber 3. Every chamber 1 and 2 is provided on its whole periphery with pockets 1' resp. 2'. The pockets 1' are covered to two thirds of their height from the rotor side. The rotor is provided also with brackets 4 which are mounted closely to the inner edge of the pockets 1'; thus, due to the high peripheral velocity of the brackets, an air pad is formed, which covers the slit 5 and does not permit direct transition of the material into the chamber 2. Consequently, the material led by means of the air pad into pockets 1' is to be worked firstly in these pockets, and only then it may pass through the slit 5 and 5' into the pockets 2' of the chamber 2. After the material has been disintegrated in the pockets 1' it is conducted, together with the air, uniformly on the whole periphery of the chamber 1, and parallel to the rotor axis, into the chamber 3 to the sieves 6 and 6', and goes finally into the reservoir 7. The latter has holes 8 covered with flannel, or other suitable material, which serve as air outlets.

The chamber 3 is provided with a jacket only in its upper portion protruding over the reservoir. The sieves 6 and 6' located in the chamber 3 are open within the reservoir 7.

The sieve 6' is movable and may be shifted radially of the sieve 6 which permits controlling the slits or meshes. For this purpose, the outer jacket of the chamber 3 is provided with a longitudinal slit 9 through which sticks out the bolt 10 secured to the sieve 6'. The bolt 10 is provided with a small plate 11 which adheres air-tightly to the inner edges of the longitudinal slit by means of a nut. The sieves 6 and 6' may be made of steel band and, consequently they are very durable, which permits of their use for such minerals which cannot be sifted through ordinary sieves because of the sharpness of the ground material.

The device 12 re-conducts the unground particles back to the working chamber for being ground once more.

The use of a special chamber 3 and of sieves 6 and 6' having optional width, considerably improves the uniform outlet of the air together with the ground material, and the objectionable over-pressure in the machine is completely removed. At the same time, the control of the meshes in the sieves having optional width permits adjustment of the machine according to the degree of fineness required and the amount of air to be led out, and the driving power of the machine is reduced to half the value actually needed, as no objectionable over-pressure is to be overcome.

I claim:

1. A grinding machine including an initial working chamber, a final working chamber and a discharge chamber, each of the working chambers being formed with pockets throughout the full periphery, a rotor operating relative to the pockets, means carried by the rotor to provide an air lock against the direct passage of material from the initial working chamber to the pockets of the second working chamber, said air lock compelling the material to be worked in the pockets of the first working chamber before being permitted to pass to the pockets of the second working chamber, and a sieve member in the discharge chamber within which the material is delivered from the pockets of the second working chamber.

2. A grinding machine including an initial working chamber, a final working chamber and a discharge chamber, each of the working chambers being formed with pockets throughout the full periphery, a rotor operating relative to the pockets, means carried by the rotor to provide an air lock against the direct passage of material from the initial working chamber to the pockets of the second working chamber, said air lock compelling the material to be worked in the pockets of the first working chamber before being permitted to pass to the pockets of the second working chamber, and a sieve member in the discharge chamber within which the material is delivered from the pockets of the second working chamber, said sieve being made up of relatively adjustable annular elements.

EUGENJUSZ KUTASZEWICZ.